(12) United States Patent
Dodson

(10) Patent No.: US 9,380,465 B2
(45) Date of Patent: Jun. 28, 2016

(54) NETWORK DESIGN IN WIRELESS COMMUNICATIONS

(71) Applicant: Smartsky Networks LLC, Charlotte, NC (US)

(72) Inventor: Mike Dodson, Paeonian Springs, VA (US)

(73) Assignee: SMARTSKY NETWORKS LLC, Charlotte, NC (US)

( * ) Notice: Subject to any disclaimer, the term of this patent is extended or adjusted under 35 U.S.C. 154(b) by 263 days.

(21) Appl. No.: 13/804,865

(22) Filed: Mar. 14, 2013

(65) Prior Publication Data

US 2014/0274074 A1   Sep. 18, 2014

(51) Int. Cl.
*H04W 40/00* (2009.01)
*H04W 16/18* (2009.01)

(52) U.S. Cl.
CPC .................................... *H04W 16/18* (2013.01)

(58) Field of Classification Search
USPC .......... 455/446, 448, 449, 550.1, 554.2, 557, 455/424, 430, 431, 427
See application file for complete search history.

(56) References Cited

U.S. PATENT DOCUMENTS

| | | | |
|---|---|---|---|
| 6,628,952 B1 * | 9/2003 | Hankins et al. | 455/446 |
| 6,735,438 B1 * | 5/2004 | Sabatino | 455/427 |
| 6,965,771 B2 * | 11/2005 | Rossi | H04B 7/18508 340/945 |
| 7,113,780 B2 * | 9/2006 | McKenna | H01Q 1/007 398/115 |
| 2002/0155833 A1 * | 10/2002 | Borel | H04B 7/18506 455/431 |
| 2005/0026608 A1 * | 2/2005 | Kallio | H04B 7/18563 455/431 |
| 2005/0192015 A1 * | 9/2005 | Abusch-Magder et al. | 455/446 |
| 2006/0293046 A1 * | 12/2006 | Smith | 455/423 |
| 2007/0021117 A1 * | 1/2007 | McKenna et al. | 455/431 |
| 2008/0102814 A1 * | 5/2008 | Chari | H01Q 1/283 455/424 |
| 2008/0108345 A1 * | 5/2008 | Calin et al. | 455/424 |
| 2010/0177660 A1 * | 7/2010 | Essinger et al. | 370/254 |
| 2013/0179058 A1 * | 7/2013 | Smith | 701/117 |

\* cited by examiner

*Primary Examiner* — Mong-Thuy Tran
(74) *Attorney, Agent, or Firm* — Nelson Mullins Riley & Scarborough LLP

(57) ABSTRACT

A system and method are provided for generating a network design based on existing network assets. One or more parameters regarding a plurality of existing wireless network assets used to provide support for a wireless communication technology can be determined. The plurality of existing wireless network assets are automatically analyzed for supporting equipment of a new wireless communication technology at least in part by comparing a set of specified criteria to the one or more parameters to determine a subset of the plurality of existing wireless network assets. An indication of the subset of the plurality of existing wireless network assets for supporting the equipment of the new wireless communication technology can accordingly be generated.

19 Claims, 7 Drawing Sheets

NETWORK DESIGN IN WIRELESS COMMUNICATIONS

TECHNICAL FIELD

Example embodiments generally relate to wireless communications and, more particularly, relate to designing networks to support wireless communications.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems, or other such devices that have a physical wired connection, wireless connections have revolutionized our ability to stay connected without sacrificing mobility.

Established networks that facilitate wireless communications are constantly being upgraded to deliver new and advanced services. The networks typically include a collection of sites that have access points or other infrastructure to support the wireless communications. Because sites have been deployed for quite some time, upgrades typically occur at existing sites. In cases were new sites are proposed, wireless carriers often follow the following methodology: a) determine target area to be served; b) develop the Radio Frequency design to best serve this area; c) select suitable locations near or within the target area for base station deployment; d) secure lease entitlements for construction of the base stations; and e) deliver backhaul services to the locations. This approach may work for established carriers, but is not optimal from a time-to-market and/or cost standpoint at least because backhaul is not yet a ubiquitous commodity and thus can be the source of delays, higher cost of construction, and higher operating costs.

In addition, while technological advances continue in relation to ground based wireless communications, air-to-ground (ATG) communication lends to additional considerations for providing wireless communications within aircraft. Conventional ground based wireless communications generally involves a two dimensional coverage paradigm whereas air-to-ground (ATG) communication is a three dimensional issue, which may involve consideration of additional factors for providing effective wireless communication services.

BRIEF SUMMARY OF SOME EXAMPLES

The continuous advancement of wireless technologies offers new opportunities for selecting sites to host new wireless technologies while attempting to lessen time-to-market for delivering the technologies, construction and operating costs associated with providing infrastructure to support the technologies, and/or the like. For example, consideration of a set of multidimensional criteria can be automated for determining sites, which can include existing wireless communication assets or related site locations, in implementing support for the technologies. The criteria can be mathematically weighted, in one example, to provide site determination tuned to specific deployment strategies. This can achieve faster deployment of the technologies, more predictable scheduling for supporting the technologies at different sites, and drive lower construction and operation costs.

In one example embodiment, a method for generating a network design based on existing network assets is provided. The method includes determining one or more parameters regarding a plurality of existing wireless network assets used to provide support for a wireless communication technology and automatically analyzing the plurality of existing wireless network assets for supporting equipment of a new wireless communication technology at least in part by comparing a set of specified criteria to the one or more parameters to determine a subset of the plurality of existing wireless network assets. The method further includes generating an indication of the subset of the plurality of existing wireless network assets for supporting the equipment of the new wireless communication technology.

BRIEF DESCRIPTION OF THE SEVERAL VIEWS OF THE DRAWING(S)

Having thus described the invention in general terms, reference will now be made to the accompanying drawings, which are not necessarily drawn to scale.

DETAILED DESCRIPTION

Figure 1:
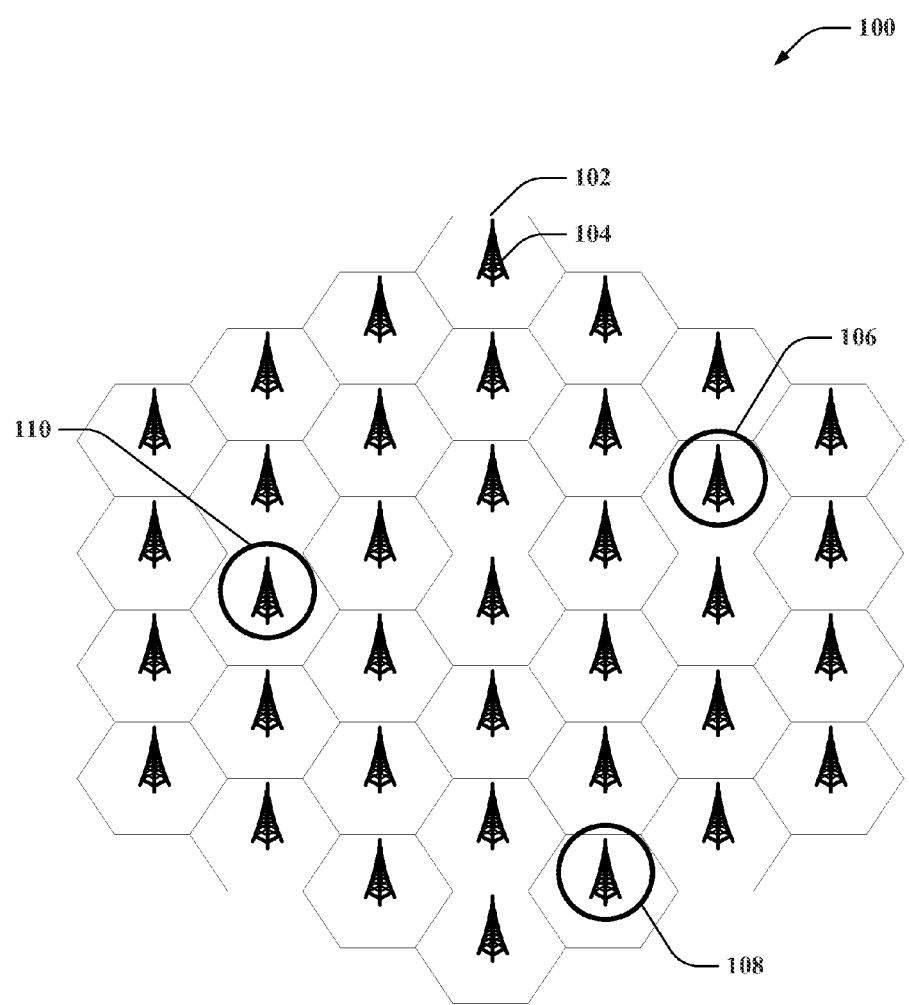
FIG. 1 is an aspect of an example network layout of existing wireless network assets.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

Some example embodiments described herein provide for designing networks to support wireless communication technologies. For example, a set of multidimensional criteria can be used to automatically evaluate existing wireless network assets for supporting additional wireless communication technologies. The set of multidimensional criteria can be defined, and/or certain criteria in the set can be weighted, for evaluating the existing wireless network assets to develop a network design for deploying the wireless communication technologies. Weighting the criteria can facilitate determining a network deployment strategy for the wireless communication technologies based at least in part on desired characteristics thereof. At least a portion of the existing wireless network assets may be indicated as possible sites for supporting the wireless communication technologies. In one example, the criteria and/or weighting thereof can be specific to supporting air-to-ground (ATG) wireless communications.

As used in this application, the terms "component," "module," "system," "device" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Artificial intelligence based systems (e.g., explicitly and/or implicitly trained classifiers) can be employed in connection with performing inference and/or probabilistic determinations and/or statistical-based determinations in accordance with one or more aspects of the subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for generating higher-level events from a set of events and/or data. Such inference results in the construction of new events or actions from a set of observed events or stored event data, regardless of whether the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.), for example, can be employed in connection with performing automatic and/or inferred actions in connection with the subject matter.

FIG. 1 illustrates an example wireless network layout 100 including multiple cells 102 for providing wireless communication services. The cells 102 can be implemented by one or more access points 104 to facilitate supporting wireless communications within a geographical coverage area of a given cell 102. In this regard, the one or more access points 104 can communicate with one or more wireless communication devices (not shown) present within a respective cell 102. The access points 104 can be assets of one or more existing wireless networks, and/or carriers supporting such networks. Each access point 104 has a wired (or wireless) backhaul connection to the one or more existing wireless networks to allow access thereto for the wireless communications devices connected with the access point 104. Moreover, the access points 104 can be provided via cellular towers or other tower structures, rooftops having wireless communication infrastructure, and/or the like. Moreover, in existing wireless networks, it is to be appreciated that some cells 102 may overlap or completely encompass another, and/or coverage gaps may exist between some cells 102, etc., though FIG. 1 shows a deployment of substantially adjacent cells.

In generating a network design for additional wireless communication technologies, some of the access points 104, or sites where the access points are installed, can be used to support the technologies to save construction costs associated with tower structures, backhaul wiring, etc. For example, the access points 104 and/or related sites can have varying features and/or properties that can make certain access points 104 and/or related sites more desirable than others. In addition, as additional wireless communication technologies are implemented, characteristics of at least some of the access points 104 and/or sites can have been modified to support the additional technologies, which can include adding antennas for radio frequency (RF) diversity and/or added RF coverage, additional backhaul bandwidth to support features of the technology, and/or the like, which may make such sites even more desirable, in some examples. Information regarding the access points 104 and/or related sites can be made available for designing networks to support new wireless communication technologies.

In this regard, a set of multidimensional criteria can be specified and compared to information regarding the access points 104 and/or related sites to determine a geographical network design. For example, the multidimensional criteria can include not only RF coverage, population density, and geological features of potential site locations, but also use of existing tower structures, existing rooftops with wireless network infrastructure, information regarding owners/managers of the structures (e.g., and/or leasing information), existence of backhaul, target service area size, equipment capabilities, equipment space utilization and/or space availability at the site, potential interference caused by/to other systems, leasing/zoning degree of difficulty, projected cost of deployment, and/or the like. Each of multiple criteria can be selected as a consideration, and/or weighted for defining relative importance between the criteria, for automatically determining installation sites for a geographical network design.

When generating a network design for a new wireless communication technology selected to use existing tower structures, the designer chooses, from the available "universe" of structures, which of those structures best meet the network design objectives (e.g. cost, time to market, RF propagation characteristics (e.g., RF coverage), backhaul availability, etc.). For example, in a given geographical area, many wireless operators may have deployed towers to meet various service objectives. The new wireless communications technology may be able to yield a suitable level of service by using many combinations of existing structures. The objective, however, may be to focus the design, and thus selection of structures, to not only yield the desired service level, but to select that subset of available structure which best satisfy the most selection criteria. For example, when considering a specific existing tower structure for the network design, additional backhaul bandwidth may have been provided at the tower structure to support other additional wireless communication technologies besides the original wireless network for which the tower was constructed. Thus, based on analyzing parameters of this specific tower structure, this structure may then receive a higher ranking or weighting in the site selection process versus other nearby sites, which may yield nearly the same coverage characteristics, however while not having sufficient backhaul and thus requiring potentially higher cost and time to construct. In one specific example, when deploying wireless technologies for ATG communications, the dimension of airspace may mitigate some line-ofsight challenges of existing ground based wireless networks, which are currently compensated by deploying additional access points.

In determining a network design for a new wireless communication technology in the example depicted in FIG. 1, use of existing tower structures can be specified as a criterion. In this regard, existing or otherwise known information of the access points 104 and/or related sites are compared with further specified and/or weighted criteria to determine and indicate a network design employing access points 106, 108, and 110, or their related sites, for installing equipment of the new technology. In this example, the additional criteria can specify target service area information from which a distance between sites can be inferred (e.g., based on known topology or other considerations), a potential signal strength of equipment being used for the new technology, etc., and the network design is generated to account for the specified criteria. When the network design is generated, measures can be taken to facilitate equipment installation using access points 106, 108, and 110, or additional equipment at the sites thereof, such as by contacting an owner of the access points 106, 108, and 110, or the related sites, to negotiate installation of additional exterior or interior equipment.

In another example, mathematical weighting can be assigned to the criteria to allow for specifying a more granular relative importance of the criteria. For instance, the criteria can be weighted based on concerns specific to the new technology, such as a higher weighting on RF coverage, backhaul throughput, and use of existing tower structures and/or rooftops than on interference concerns, leasing/zoning or site owner/manager issues, etc. Thus, in this example, access points 106, 108, and 110 can be selected in the generated network design as these access points may allow for the needed RF coverage area, may have more backhaul throughput than neighboring access points, etc. It is to be appreciated, though shown in FIG. 1 as cells 102 and access points 104, that other existing wireless network assets or related site locations can be considered as well, such as rooftops with wireless infrastructure, sites with existing backhaul, and/or the like. These approaches to designing networks for wireless communications can result in faster deployment by using existing sites (e.g., that have favorable owners/managers, low interference, low degree of leasing/zoning restrictions, etc.), more predictable scheduling for deployment, lower initial and operating costs, etc.

Figure 2:
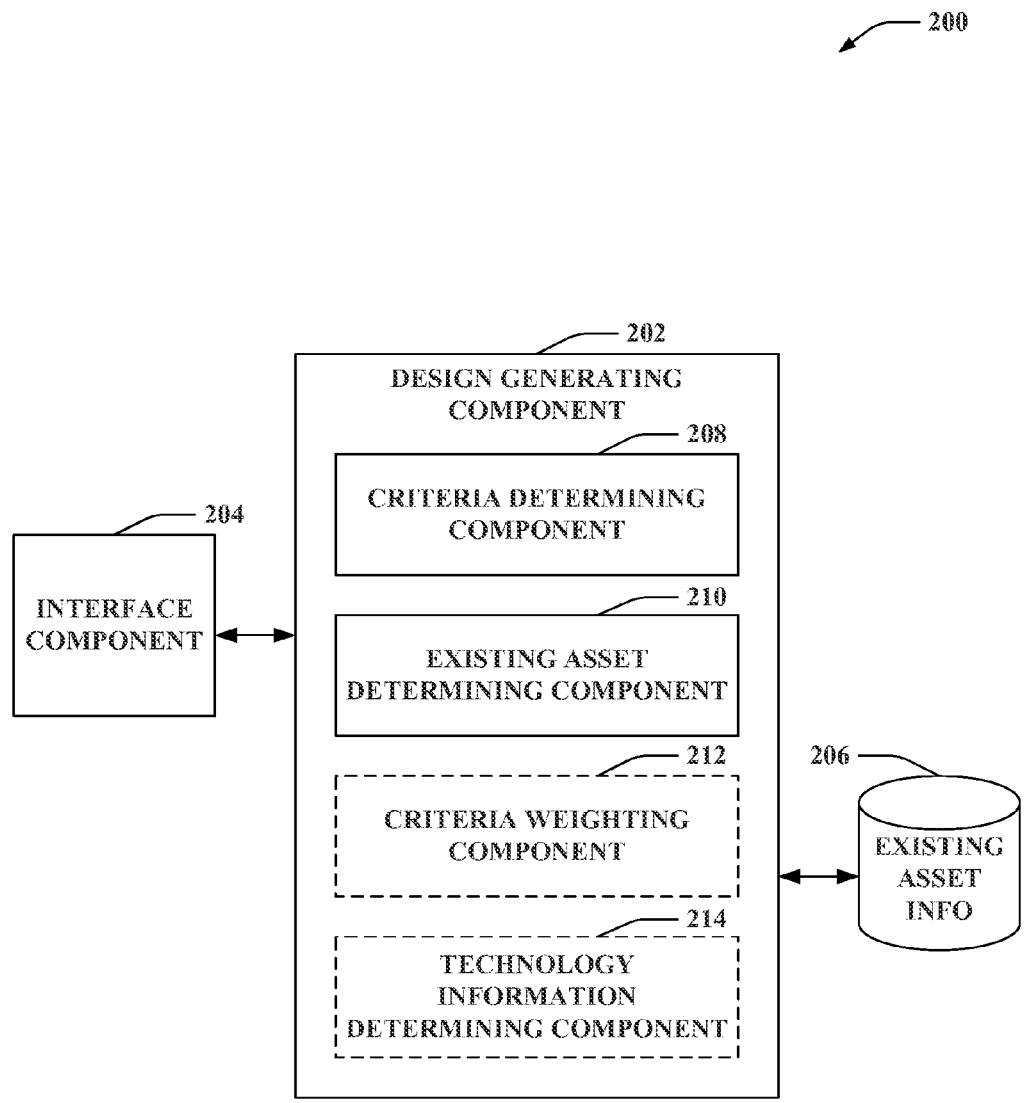
FIG. 2 is an aspect of an example system for generating a network design using existing wireless network assets.

FIG. 2 illustrates an example system 200 for generating a network design for a wireless communication technology. System 200 includes a design generating component 202 for creating a network design based at least in part on specified criteria regarding a wireless communication technology and/or existing network assets used for other wireless communication technologies. System 200 also includes an interface component 204 for facilitating utilization of the design generating component 202, and an existing asset information database 206 for storing and/or allowing retrieval of various parameters regarding existing wireless network assets deployed in a given area. Design generating component 202 can be a server or other computer configured to automatically determine a network design. Interface component 204 can be, or can include, a graphical user interface (GUI) allowing interaction with the design generating component 202 via various input/output devices of a computer. Existing asset information database 206 can be a relational database or other memory for storing various information described herein. In an example, design generating component 202, interface component 204, and/or existing asset information database 206 can be locally or remotely located from one another, and can be, or can include, multiple other components not shown. In this regard, in one example, one or more of the components 202, 204, or 206, and/or components thereof, can include various servers in a cloud computing environment.

Design generating component 202 includes a criteria determining component 208 for obtaining a set of multidimensional criteria to consider in evaluating existing network assets, or related site locations, for use in deploying a new wireless communication technology, and an existing asset determining component 210 for receiving or storing information regarding one or more existing assets, or related site locations, of a wireless network. Design generating component 202 optionally includes a criteria weighting component 212 for assigning mathematical weights to at least some of the criteria to indicate a relationship between the criteria, and/or a technology information determining component 214 for indicating additional information regarding the new wireless communication technology for consideration in designing the network.

According to an example, interface component 204 can be used to specify criteria to consider in generating a network design for deploying a new wireless communication technology. For example, interface component 204 can allow for selection of certain criteria, such as RF coverage area, population density, geological features of cell location, whether to use existing tower structures and capabilities thereof, whether to use existing rooftops with wireless network infrastructure, information regarding owners/managers of the structures (e.g., and/or leasing information), existence of backhaul and/or related capabilities, target service area, potential interference from other systems, leasing/zoning degree of difficulty, maximum projected cost of deployment, and/or the like. Some criteria can have associated input values, in one example, which can include an operating value (e.g., target service area or capability of equipment for the new technology), a desired value (e.g., RF coverage area, required backhaul throughput), and/or the like. In other examples, selection of certain criteria can indicate a desire to maximize values for the given criteria in generating the network design. Interface component 204 can also include a mechanism for initiating the network design generation using the selected or otherwise specified criteria.

Design generating component 202 can determine to initiate a process to generate a network design based at least in part on receiving a request from interface component 204, in one example. Criteria determining component 208 can obtain a list of selected or otherwise specified criteria (and/or related values) to consider in generating the network design, which can be received as part of the request from interface component 204, obtained from a configuration file or other input source, etc. Existing asset determining component 210 can obtain information regarding existing assets of wireless networks (e.g., from existing asset information database 206). The obtained information can include parameters regarding assets and/or related sites in the wireless networks. For example, the parameters can include a location of the sites (e.g., latitude/longitude or similar coordinates obtained via GPS or other means), backhaul capability, throughput, etc. at the sites, terrain or morphology information regarding the sites, observed serviceable area of the sites (or other information regarding cell boundaries and/or dead zones), population information at a sites, usage or load information regarding access points at or near the sites (e.g., and/or bandwidth availability), RF equipment space utilization, antenna tower loading at the sites, owner/manager information of the sites, measured or inferred interference metrics at the sites, leasing/ zoning information at the sites (e.g., degree of difficulty in obtaining variances, etc., which can be based on historical information), and/or the like.

In addition, technology information determining component 214 can obtain specific criteria regarding the new wireless communication technology, such as a RF coverage, equipment coverage details (e.g., signal strength), throughput requirements, or other specific information. Technology information determining component 214 can similarly receive this criteria via interface component 204, as described in one example, configuration file or other input source, etc. In one example, where the new wireless communication technology correlates to ATG wireless communications, specific information can include known flight routes, estimated bandwidth demands for the flights (e.g., based on a class of the flight, time-of-day for scheduled departure, etc.), geographic handover strategies to facilitate network efficiency, or other information specific to the implementation. In any case, design generating component 202 can analyze these additional criteria in generating the network design.

Design generating component 202 can analyze the specified criteria and/or technology related information in light of the obtained existing asset information to generate a proposed network design for a new wireless communication technology. For example, where criteria determining component 208 obtains selected criteria of using existing tower structures, existing backhaul, target service area, and/or technology information relating to equipment of the new technology capable of covering communications within a certain distance, existing asset determining component 210 can determine existing sites having a tower structure and/or backhaul capable sites that allow for providing coverage over the target service area using the equipment for generating the network design. In one example, design generating component 202 can consider geological terrain or morphology near the existing assets to adjust for potential decrease in equipment performance in determining assets or site locations for the network design.

In another example, criteria determining component 208 can also determine a low population density criteria, which can be specified using interface component 204 such to avoid installation in large cites, which may have many structures that can cause signal interference, high RF resource utilization, and/or the like. In this example, existing asset determining component 210 determines the sites that allow for providing coverage within the certain distance while avoiding sites in highly populated areas. In either case, for example, design generating component 202 can generate a network design including the assets or related site locations that satisfy (or result in a best attempt at satisfying) the various specified criteria.

In one example, interface component 204 can allow specification of criteria that corresponds to the information in existing asset information database 206. In this example, design generating component 202 can provide interface component 204 with a list of possible criteria to consider in generating the network design and/or can allow for selecting the criteria as to be considered, specifying a required or desired value for the criteria, and/or the like, as described. Thus, for example, where existing asset information 206 includes whether the asset relates to an existing tower structure, rooftop, backhaul-capable site, etc., design generating component 202 can provision interface component 204 with such properties as a selectable criteria and/or as possible values for a parameter of a criterion (e.g., site properties) based on values stored in existing asset information database 206.

Moreover, for example, interface component 204 can allow for specification of conditional expressions or other algorithms/logic relating to the criteria for determining existing assets for recommendation in the network design. For example, the algorithms or logic can include an expression using parameters and corresponding values or ranges of values along with logical operators, conditional operators, and/or the like. Criteria determining component 208 can parse the expressions in comparing against the existing asset information to allow design generating component 202 to determine existing assets to include in the network design based on the expressions.

In yet another example, criteria weighting component 212 can determine weights assigned to given criteria to determine a relationship between the criteria. In this regard, design generating component 202 can utilize in selecting existing assets that result in a best match of the weighted criteria for recommending as the network design. For example, design generating component 202 can select existing assets that satisfy highly weighted criteria to a greater extent than lower weighted criteria (e.g., where not all criteria can be satisfied) in generating the best match. In one example, interface component 204 can specify a higher weight on existence of backhaul than cost of deployment, in which case design generating component 202 can consider and recommend building on sites with existing wired backhaul (e.g., and/or desirable backhaul properties, such as bandwidth) though it may increase building costs (e.g., over using sites with tower structures that have wireless backhaul or insufficient backhaul properties).

Design generating component 202 can output a map indicating existing assets or related site locations to utilize for equipment installation. For example, interface component 204 can receive the map or related information from design generating component 202 for displaying the map. In another example, design generating component 202 can output asset identifiers (e.g., cell identifiers for access points), generate latitude/longitude coordinates, or generate other location information related to the assets or site locations for installing equipment. In either example, design generating component 202 can rank the assets or site locations according to desirability or best match to the specified criteria and/or weighting values. Design generating component 202 can also determine and provide contingent sites for those selected to ensure the criteria of the network design are satisfied (or at least nearly satisfied) where installation at one or more selected assets or related site locations is not feasible or possible.

In a specific example, interface component 204 can allow for specifying criteria to design a network for ATG wireless communications. In this example, criteria such as use of existing tower structures, use of existing rooftops with wireless infrastructure, owners/managers of the structures, existence of backhaul, target service area (e.g., up to 100 kilometer (km) area), interference to/from other systems, leasing/zoning degree of difficulty, and/or cost can be specified. This can include selecting the criteria to be considered, specifying values desired for the criteria, and/or the like. In addition, the criteria can be weighted with respect to one another to emphasize certain criteria. Criteria determining component 208 can obtain the criteria and/or related values, and criteria weighting component 212 can obtain any specified weight values for the criteria. In one example, the foregoing criteria can be weighted over any other provided criteria, or can otherwise be the set of specific criteria used in designing the network for ATG wireless communications. In addition, technology information determining component 214 can determine certain information regarding the ATG wireless communication technology (e.g., from interface component 204 or other input source), such as equipment capabilities, geographical limitations on handover of wireless communication devices, and/or the like.

In this example, design generating component 202 can consider the various criteria, weighting thereof, information specific to the ATG wireless communication technology, etc. in generating the network design. For example, as use of current network assets, including tower structures, rooftops, sites with existing backhaul, etc., are specified criteria, existing asset determining component 210 can query existing asset information database 206 to obtain information regarding these assets or related site locations of existing wireless networks. Design generating component 202 can further filter the existing assets or related site locations based on the other specified criteria to include assets of certain owner/managers, assets/locations that allow the specified target service area, assets/locations having no more than a specified interference level, assets at site locations having no more than a specified degree of difficulty in leasing/zoning, etc. In addition, design generating component 202 can further filter the assets or related sites based on the specified projected cost to build criteria.

In this example, design generating component 202 (e.g., before or after filtering the existing assets based on the foregoing criteria), can filter assets or related site locations based on ability to provide a target service area of 100 km. Thus, design generating component 202 can select assets or site locations within nearly 100 km of one another. In one example, design generating component 202 can also consider terrain in adjusting a potential coverage area of equipment of the new wireless technology to an attainable effective coverage area, and can use the effective coverage area in selecting additional surrounding sites for the network design. For example, where the terrain is mountainous or otherwise fluctuates, the effective coverage area for the equipment may decrease. This can be a technology specific consideration, however, as three-dimensional communication technologies, such as ATG communications, may not be affected as much by changes in terrain as two-dimensional communication technologies (e.g., existing ground based wireless communications). Furthermore, design generating component 202 can avoid sites in highly populated areas, as selecting sites in such areas may lead to selection of more sites than necessary due to structures that can block signals, high loading on the backhaul structure or other network congestions, and/or the like.

In other examples, design generating component 202 can use other information specific to ATG wireless technology, such as known flight routes, in selecting the assets or related sites for the network design. In this regard, design generating component 202 may not need to select assets in areas over which aircraft using the ATG technology do not fly. Additionally, in an example, design generating component 202 can consider geographic handover limitations or other limitations of the technology. For example, to promote network efficiency, the ATG technology may only allow handover in certain directions (e.g., a longitudinal direction), and thus design generating component 202 may select assets or site locations for the network design that are closer together longitudinally than by latitude.

In additional examples, design generating component 202 can analyze a deployed network for generating an updated network design. In this example, technology information determining component 214 can obtain information regarding generic statistics, site-specific statistics, etc. of the new technology such that design generating component 202 can consider the statistics in recommending design modifications. For example, the statistics can include network or site throughput achieved, reports of dropped service, reports of interference from existing networks, and/or the like. Technology information determining component 214 can obtain the information via interface component 204, whether by specification on a GUI, specification using an API, importation of a configuration file, log file, or other statistical record, and/or the like. Thus, for example, where the statistics indicate dropped service in a specific area, design generating component 202 can determine additional sites in modifying the network design to account for lack of service in the specific area. In one example, design generating component 202 can recall the criteria used in generating the original network design, and can determine the additional sites based further on the criteria.

Figure 3:
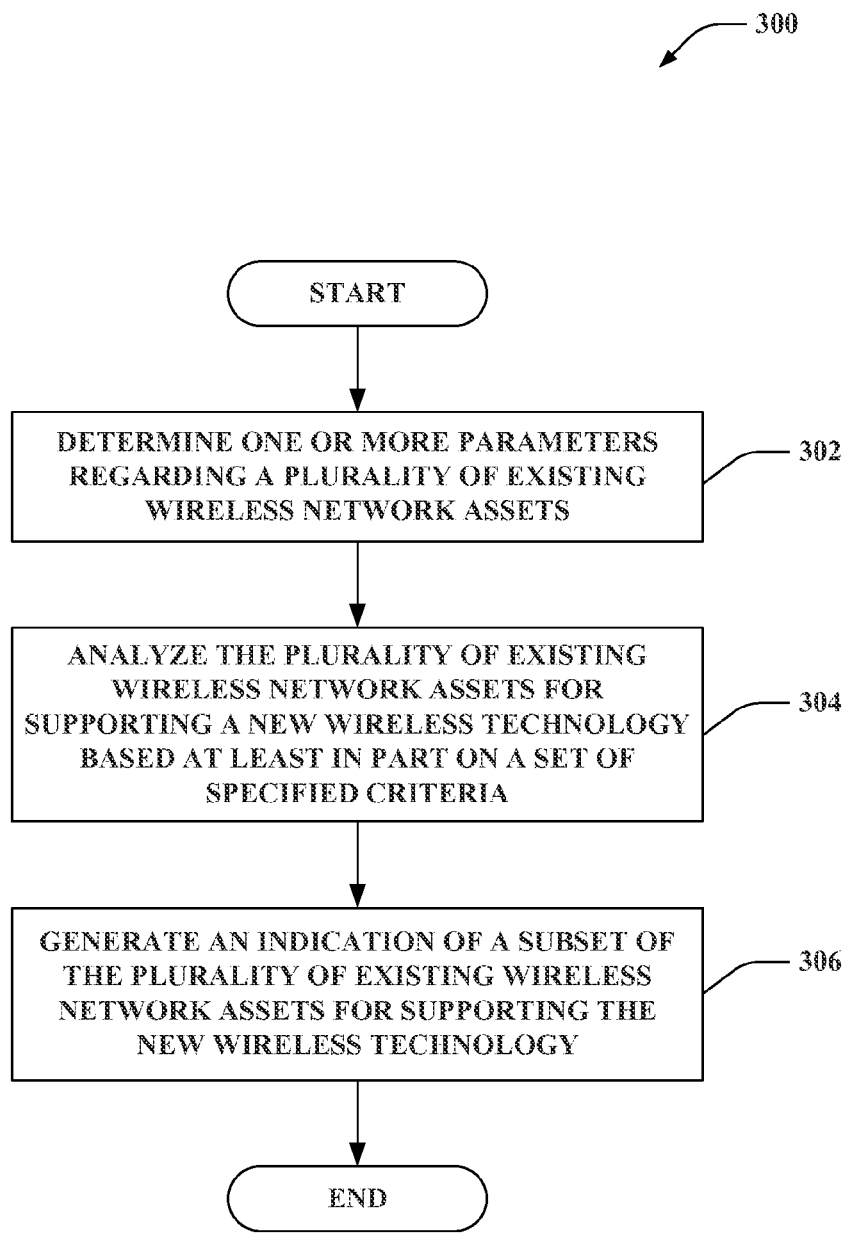
FIG. 3 is an aspect of example methodology for generating a network design according to a set of specified criteria.
Figure 4:
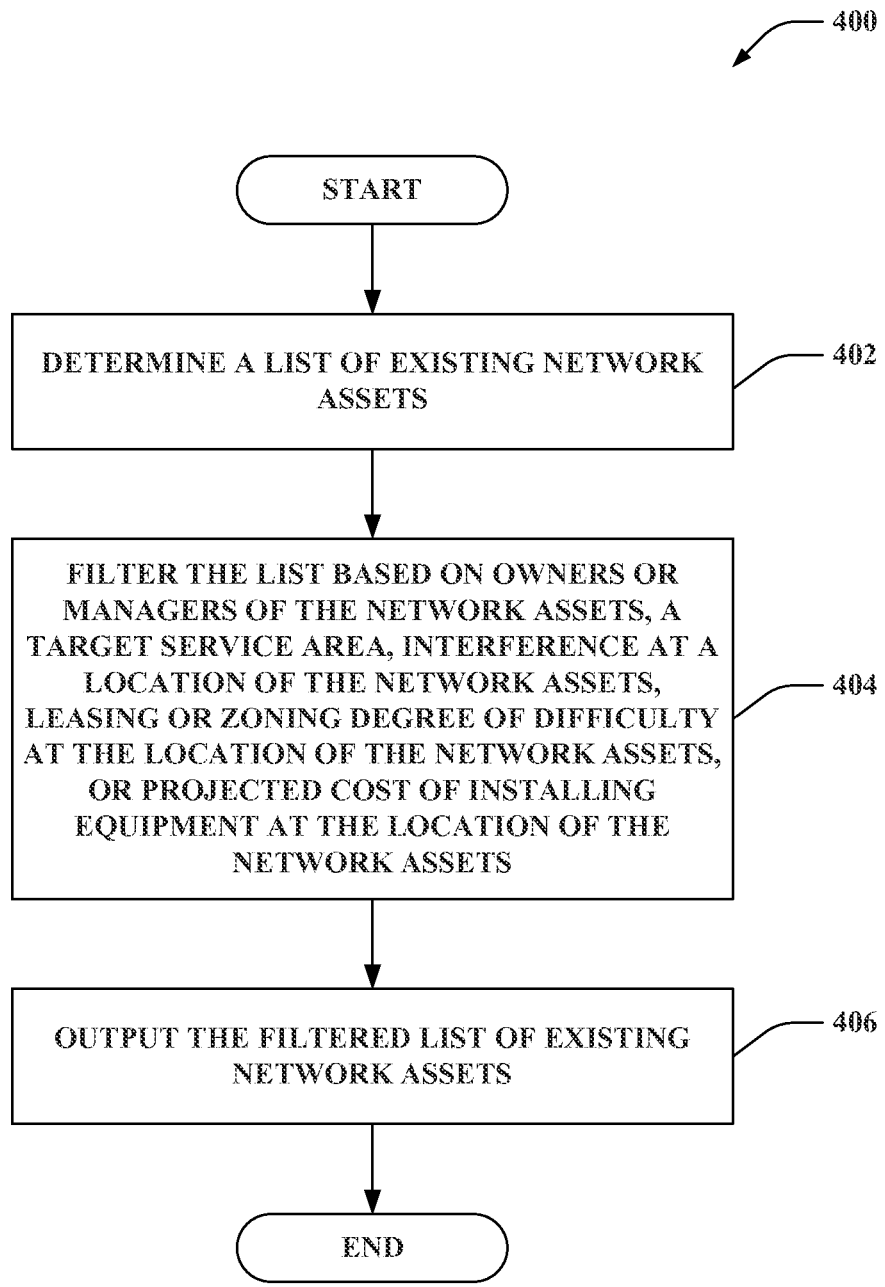
FIG. 4 is an aspect of an example methodology for filtering a list of existing network assets based on one or more criteria.
Figure 5:
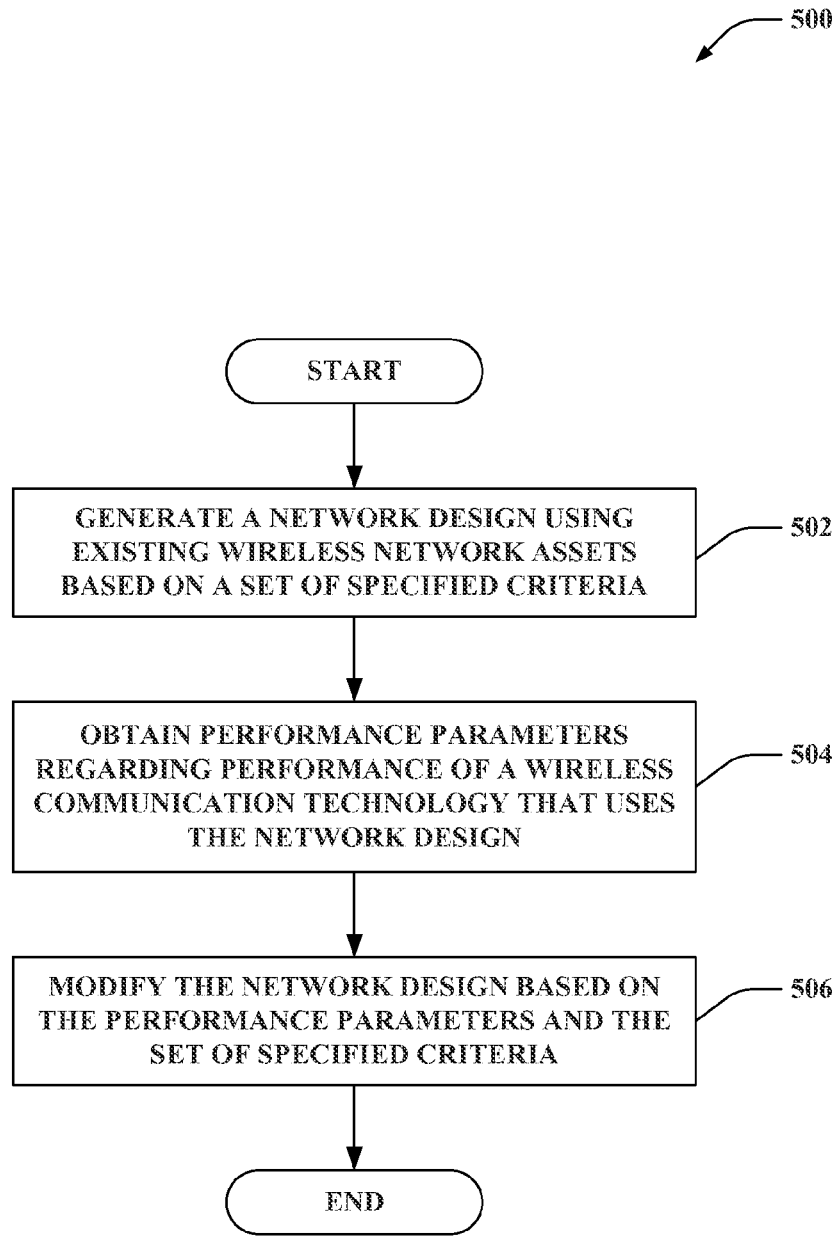
FIG. 5 is an aspect of an example methodology for updating a generated network design based on subsequently received performance parameters.

Referring to FIGS. 3-5, methodologies that can be utilized in accordance with various aspects described herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 3 illustrates an example methodology 300 for indicating existing wireless network assets for supporting new wireless network technologies. At 302, one or more parameters regarding a plurality of existing wireless network assets can be determined. For example, this can include determining a location, owner or manager, backhaul capabilities, interference parameters, leasing or zoning degree of difficulty, projected cost to build, or other parameters regarding the existing wireless network assets. The existing wireless network assets can correspond to existing tower structures, existing rooftops with wireless infrastructure, site locations with existing backhaul capability deployed, and/or the like.

At 304, the plurality of existing network assets can be analyzed for supporting a new wireless network technology based at least in part on a set of specified criteria. For example, this can include comparing the set of specified criteria to the one or more parameters determined for the plurality of existing wireless network assets. In one example, the set of specified criteria can correlate to the one or more parameters. For example, an interface can be provided to allow selecting or otherwise specifying at least a portion of the parameters as criteria for analyzing the plurality of existing wireless network assets, assigning acceptable values for the parameters, applying weighting values to the criteria, and/or the like, which can be taken into account in analyzing the plurality of existing wireless network assets, as described. A subset of the plurality of existing wireless network assets can be determined for supporting the new wireless network technology based on the comparing the set of specified criteria (e.g., as weighted) with the one or more parameters and/or additional information regarding the new wireless communication technology.

At 306, an indication of a subset of the plurality of existing wireless network assets can be generated for supporting the new wireless technology. For example, this can include generating a map of the existing wireless network assets along with an indication of the subset of existing wireless network assets that can be used to support the new wireless technology. In another example, this can include indicating a list of identifiers for the subset of the plurality of existing network assets, such as a cell identifier for one or more access points, latitude/longitude location coordinates, a postal address, and/or the like. Moreover, this can include generating indications for contingent existing wireless network assets as well where utilization of some of the wireless network assets is not feasible or possible.

FIG. 4 illustrates an example methodology 400 for filtering a list of existing network assets according to various criteria. At 402, a list of existing network assets can be determined. For example, this can include obtaining the list from a database including existing tower structures, rooftops with wireless infrastructure, site locations with backhaul capabilities, or other assets and related site locations owned by wireless communication providers. Additional information can be obtained as part of the list as well, such as location of the network assets, owners of the network assets, interference information at the location, degree of difficulty in obtaining leases or zoning variances at the location, projected cost of installation at the location, and/or the like.

At 404, the list can be filtered based on owners or managers of the network assets, a target service area, interference at a location of the network assets, leasing or zoning degree of difficulty at the location of the network assets, or projected cost of installing equipment at the location of the network assets. In one example, these parameters can be specified as criteria for the filtering and considered along with weighting values or other representation of importance for some of the parameters over others. In addition, acceptable values can be specified for the parameters to facilitate filtering the list of the existing network assets. At 406, the filtered list of existing network assets can be outputted, as described previously.

FIG. 5 illustrates an example methodology 500 for modifying a generated network design. At 502, a network design can be generated using existing wireless network assets based on a set of specified criteria. As described, the criteria can relate to RF coverage area, population density, geological features of potential site locations, use of existing tower structures, existing rooftops with wireless network infrastructure, information regarding owners/managers of the structures (e.g., and/or leasing information), existence of backhaul, target service area size, signal strength capabilities, potential interference caused by/to other systems, leasing/zoning degree of difficulty, projected cost of deployment, and/or the like, and the specified criteria may or may not be weighted.

The network can be deployed according to the network design, and at 504, performance parameters regarding performance of a wireless communication technology that uses the network design can be obtained. The parameters can be imported from a log file or other statistical representation, manually input via an interface, and/or the like. The parameters can include information regarding a location to which the parameters relate to allow evaluating specific locations of the deployment.

At 506, the network design can be modified based on the performance parameters and the set of specified criteria. Thus, for example, where throughput is below a threshold at a location, according to the parameters, the network design can be modified to recommend moving equipment to a new site, deploying additional equipment near the site, etc., based on criteria considered when the network design was originally generated.

Figure 6:
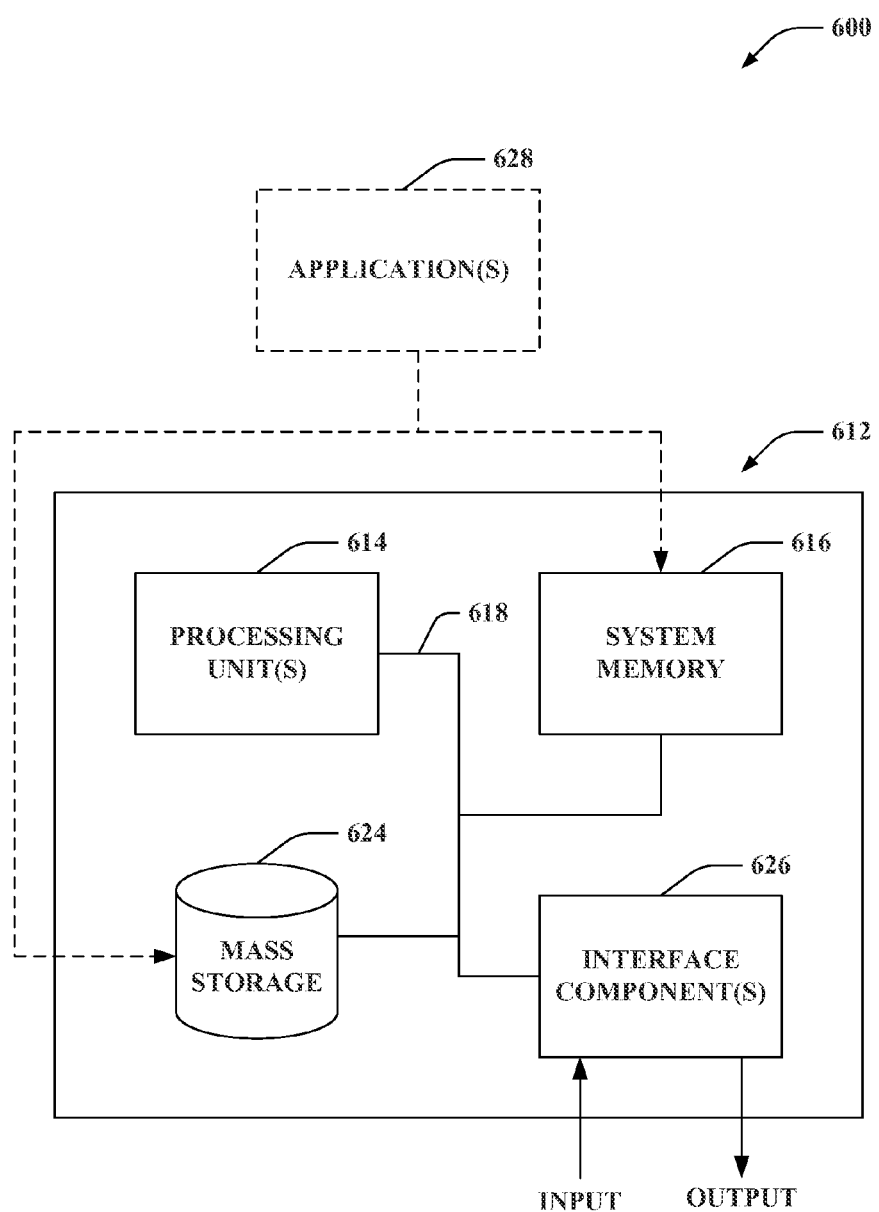
FIG. 6 is an aspect of an example system in accordance with aspects described herein.
Figure 7:
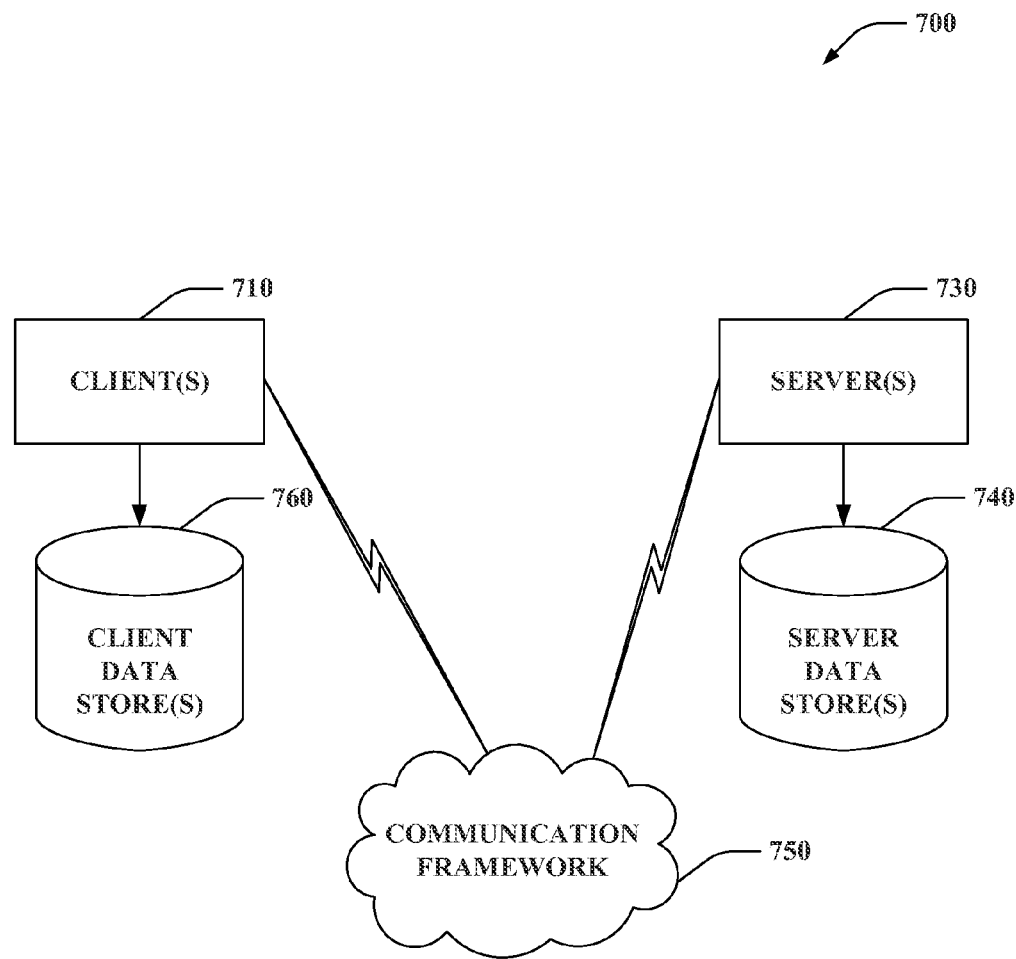
FIG. 7 is an aspect of an example communication environment in accordance with aspects described herein.

To provide a context for the various aspects of the disclosed subject matter, FIGS. 6 and 7 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 6, an exemplary environment 600 for implementing various aspects disclosed herein includes a computer 612 (e.g., desktop, laptop, server, hand held, programmable consumer or industrial electronics . . . ). The computer 612 includes a processing unit 614, a system memory 616 and a system bus 618. The system bus 618 couples system components including, but not limited to, the system memory 616 to the processing unit 614. The processing unit 614 can be any of various available microprocessors. It is to be appreciated that dual microprocessors, multi-core and other multiprocessor architectures can be employed as the processing unit 614.

The system memory 616 includes volatile and nonvolatile memory. The basic input/output system (BIOS), containing the basic routines to transfer information between elements within the computer 612, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 612 also includes removable/non-removable, volatile/non-volatile computer storage media. FIG. 6 illustrates, for example, mass storage 624. Mass storage 624 includes, but is not limited to, devices like a magnetic or optical disk drive, floppy disk drive, flash memory or memory stick. In addition, mass storage 624 can include storage media separately or in combination with other storage media.

FIG. 6 provides software application(s) 628 that act as an intermediary between users and/or other computers and the basic computer resources described in suitable operating environment 600. Such software application(s) 628 include one or both of system and application software. System software can include an operating system, which can be stored on mass storage 624, that acts to control and allocate resources of the computer system 612. Application software takes advantage of the management of resources by system software through program modules and data stored on either or both of system memory 616 and mass storage 624.

The computer 612 also includes one or more interface components 626 that are communicatively coupled to the bus 618 and facilitate interaction with the computer 612. By way of example, the interface component 626 can be a port (e.g., serial, parallel, PCMCIA, USB, FireWire . . . ) or an interface card (e.g., sound, video, network . . . ) or the like. The interface component 626 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 612 to output device(s) via interface component 626. Output devices can include displays (e.g., cathode ray tube (CRT), liquid crystal display (LCD), light emitting diode (LCD), plasma . . . ), speakers, printers and other computers, among other things.

According to an example, computer 612 can generate a network design, provide an interface for specifying criteria to consider in generating the network design, etc., as described. In this example, the processing unit(s) 614 can comprise or receive instructions related to generating the network design, and/or other aspects described herein. It is to be appreciated that the system memory 616 can additionally or alternatively store such instructions and the processing unit(s) 614 can be utilized to process the instructions.

FIG. 7 is a schematic block diagram of a sample-computing environment 700 with which the subject innovation can interact. The environment 700 includes one or more client(s) 710. The client(s) 710 can be hardware and/or software (e.g., threads, processes, computing devices). The environment 700 also includes one or more server(s) 730. Thus, environment 700 can correspond to a two-tier client server model or a multi-tier model (e.g., client, middle tier server, data server), amongst other models. The server(s) 730 can also be hardware and/or software (e.g., threads, processes, computing devices). The servers 730 can house threads to perform transformations by employing the aspects of the subject innovation, for example. One possible communication between a client 710 and a server 730 may be in the form of a data packet transmitted between two or more computer processes.

The environment 700 includes a communication framework 750 that can be employed to facilitate communications between the client(s) 710 and the server(s) 730. Here, the client(s) 710 can correspond to program application components and the server(s) 730 can provide the functionality of the interface and optionally the storage system, as previously described. The client(s) 710 are operatively connected to one or more client data store(s) 760 that can be employed to store information local to the client(s) 710. Similarly, the server(s) 730 are operatively connected to one or more server data store(s) 740 that can be employed to store information local to the servers 730.

By way of example, one or more clients 710 can include interfaces for requesting generation of network designs from server(s) 730 via communication framework 750. The server(s) 730 can generate the network designs based on criteria specified by the client(s) 710, existing network asset information stored in server data store(s), etc., and can provide an output of the network design to client(s) 710 via communication framework 750, as described herein.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise random access memory (RAM), read-only memory (ROM), electrically erasable programmable ROM (EEPROM), compact disc (CD)-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. A method for generating an air-to-ground (ATG) network design in an automated design system comprising input interfaces and output interfaces based on existing network assets, the method comprising:
    receiving a request at an input interface, the request comprising network design criteria specifying existing wireless network assets and an ATG wireless communication technology;
    determining one or more parameters regarding a plurality of existing wireless network assets used to provide support for a ground based wireless communication technology;
    obtaining a multidimensional set of technology specific criteria of the ATG wireless communication technology necessary to implement the ATG network;

automatically analyzing the plurality of existing wireless network assets for supporting equipment of the ATG wireless communication technology at least in part by comparing the set of specified criteria defining technology specific considerations for ATG communication to the one or more determined parameters to determine a subset of the plurality of existing wireless network assets; and generating, at the output interface, an indication of the subset of the plurality of existing wireless network assets for supporting the equipment of the ATG wireless communication technology;

wherein the ATG wireless communication technology is technology for wireless communications between air vehicles and ground based communication equipment.

2. The method of claim 1, wherein the plurality of existing wireless network assets includes existing tower structures, existing rooftops with wireless infrastructure, or sites having existing backhaul connectivity for supporting the ground based wireless communication technology.

3. The method of claim 1, wherein at least a portion of the set of specified criteria have associated weighting values, and the comparing comprises comparing the set of specified criteria as weighted by the weighting values to the one or more parameters.

4. The method of claim 1, wherein the set of specified criteria includes certain types of assets of the plurality of existing wireless network assets to consider for supporting the equipment of the ATG wireless communication technology.

5. The method of claim 4, wherein the set of specified criteria includes a target service area to achieve in supporting the equipment of the ATG wireless communication technology.

6. The method of claim 5, wherein the set of specified criteria further includes interference thresholds at site locations of the plurality of existing wireless network assets to consider for supporting the equipment of the ATG wireless communication technology.

7. The method of claim 6, wherein the set of specified criteria further includes owners or managers of the certain types of assets to consider for supporting the equipment of the ATG wireless communication technology.

8. The method of claim 7, wherein the set of specified criteria further includes a leasing or zoning degree of difficulty at the site locations of the plurality of existing wireless network assets to consider for supporting the equipment of the ATG wireless communication technology.

9. The method of claim 8, wherein the set of specified criteria further includes a maximum projected cost of deploying the ATG wireless communication technology at the site locations of the plurality of existing wireless network assets to consider for supporting the equipment of the ATG wireless communication technology.

10. The method of claim 1, wherein the set of specified criteria comprises information specific to the ATG wireless communication technology, and wherein the automatically analyzing is further based at least in part on the information specific to the ATG wireless communication technology.

11. The method of claim 10, wherein the information specific to the ATG wireless communication technology comprises one or more capabilities of the equipment.

12. The method of claim 11, wherein the one or more capabilities of the equipment comprises a potential coverage area of the equipment for communication with in-flight aircraft.

13. The method of claim 12, wherein the automatically analyzing further comprises considering terrain or morphology properties at a location of at least one of the subset of the plurality of existing wireless network assets to determine an effective coverage area for the equipment based on the potential coverage area of the equipment and the terrain or morphology properties at the location, and determining at least a portion of the subset of the plurality of existing wireless network assets based at least in part on the effective coverage area for the equipment.

14. The method of claim 10, wherein the information specific to the ATG wireless communication technology comprises throughput requirements for the ATG wireless communication technology.

15. The method of claim 1, wherein the generating the indication comprises displaying a map comprising the existing wireless network assets with an indication of the subset of the plurality of existing wireless network assets determined to support the equipment of the ATG wireless communication technology.

16. The method of claim 1, wherein the generating the indication comprises generating a list of identifiers of the subset of the plurality of existing wireless network assets for supporting the equipment of the ATG wireless communication technology.

17. The method of claim 1, further comprising generating one or more indications of contingent existing wireless network assets for at least a portion of the subset of the plurality of existing wireless network assets.

18. A system for generating an air-to-ground (ATG) network design in an automated design system comprising input interfaces and output interfaces based on existing network assets, comprising:

an input interface configured to receive a request, the request comprising network design criteria specifying existing wireless network assets and an ATG wireless communication technology;

an existing asset determining component configured to obtain information regarding a plurality of existing network assets or related site locations based on the request;

a criteria determining component configured to obtain one or more criteria defining technology specific considerations for ATG communication regarding an ATG wireless communication technology and to obtain a multidimensional set of technology specific criteria of the ATG wireless communication technology necessary to implement the ATG network; and a design generating component configured to analyze the plurality of existing network assets or related site locations based at least in part on the one or more criteria defining technology specific considerations for ATG communication to generate an indication of a portion of the plurality of existing network assets or related site locations to use in deploying equipment of the ATG wireless communication technology at an output interface;

wherein the ATG wireless communication technology is technology for wireless communications between air vehicles and ground based communication equipment.

19. The system of claim 18, further comprising:

a criteria weighting component configured to determine one or more weighting values assigned to the one or more criteria, wherein the design generating component analyzes the plurality of existing network assets or related site locations further based at least in part on the one or more weighting values.

\* \* \* \* \*